US009827507B2

(12) United States Patent
Muthyala et al.

(10) Patent No.: US 9,827,507 B2
(45) Date of Patent: *Nov. 28, 2017

(54) TOY CONSTRUCTION SYSTEM FOR AUGMENTED REALITY

(75) Inventors: Siddharth Muthyala, Billund (DK); Harm Jan Van Beek, HA Rotterdam (NL); Nicolas David Alain Guyon, St. Barthelemy d'Anjou (FR); Frantz Lasorne, Nantes (FR); Mikkel Holm Jensen, Aarhus (DK)

(73) Assignee: LEGO A/S, Billund (DK)

( * ) Notice: Subject to any disclaimer, the term of this patent is extended or adjusted under 35 U.S.C. 154(b) by 284 days.

This patent is subject to a terminal disclaimer.

(21) Appl. No.: 14/119,556

(22) PCT Filed: May 22, 2012

(86) PCT No.: PCT/EP2012/059469
§ 371 (c)(1),
(2), (4) Date: Apr. 22, 2014

(87) PCT Pub. No.: WO2012/160055
PCT Pub. Date: Nov. 29, 2012

(65) Prior Publication Data
US 2014/0378023 A1     Dec. 25, 2014

(30) Foreign Application Priority Data
May 23, 2011    (DK) ................. 2011 70254

(51) Int. Cl.
*A63H 33/04*      (2006.01)
*G06T 19/00*      (2011.01)
*A63F 9/24*       (2006.01)

(52) U.S. Cl.
CPC .......... *A63H 33/042* (2013.01); *G06T 19/00* (2013.01); *A63F 2009/246* (2013.01); *A63F 2250/287* (2013.01)

(58) Field of Classification Search
CPC ..................................................... A63H 33/04
(Continued)

(56) References Cited

U.S. PATENT DOCUMENTS 3,005,282 A    10/1961 Christiansen
3,670,941 A     6/1972 Grinnell et al.
(Continued)

FOREIGN PATENT DOCUMENTS

DE    100 06 834 A1    8/2001
EP    1 047 021 A2    10/2000
(Continued)

OTHER PUBLICATIONS

Extended European Search Report in related European application No. EP 16152094.5, dated Jun. 16, 2014.
(Continued)

*Primary Examiner* — Aarti B Berdichevsky
*Assistant Examiner* — Dolores Collins
(74) *Attorney, Agent, or Firm* — Day Pitney LLP

(57) ABSTRACT

A toy construction system comprising toy construction elements, the toy construction elements comprising coupling means for releasably interconnecting the toy construction elements, comprising one or more marker construction elements comprising such coupling means and each having a visual appearance recognizable by an image processing means, and a data processing system comprising image capturing means, image processing means, and display means, wherein the data processing system is adapted to capture an image of a toy construction model constructed from the toy construction elements, to process the captured image to detect at least a presence of at least one of the marker construction elements within the captured image; responsive to the detected marker construction element, to generate a computer-generated image; and to display on said
(Continued)

display means a composite image comprising the captured image having superimposed the generated computer-generated image.

17 Claims, 5 Drawing Sheets

(58) Field of Classification Search
USPC .......................................................... 446/91
See application file for complete search history.

(56) References Cited

U.S. PATENT DOCUMENTS

| | | | |
|---|---|---|---|
| 3,670,942 | A | 6/1972 | Pomeroy |
| 5,042,972 | A | 8/1991 | Bach et al. |
| 5,697,829 | A * | 12/1997 | Chainani .............. A63H 17/395 318/568.12 |
| 5,724,074 | A * | 3/1998 | Chainani .............. A63H 17/395 345/474 |
| 5,867,166 | A * | 2/1999 | Myhrvold .............. G06T 11/001 345/419 |
| 6,389,375 | B1 | 5/2002 | Thomsen et al. |
| 7,596,473 | B2 * | 9/2009 | Hansen ................... G06F 17/50 345/420 |
| 7,979,251 | B2 | 7/2011 | Jakobsen |
| 8,374,829 | B2 | 2/2013 | Jakobsen |
| 8,615,471 | B2 * | 12/2013 | Hannigan .............. G06Q 30/02 463/1 |
| 2002/0127944 | A1 | 9/2002 | Spector |
| 2005/0024360 | A1 * | 2/2005 | Abe ....................... G06F 3/0325 345/419 |
| 2006/0221081 | A1 | 10/2006 | Cohen |
| 2007/0262984 | A1 * | 11/2007 | Pruss ...................... G06T 19/20 345/420 |
| 2009/0029771 | A1 | 1/2009 | Donahue |
| 2009/0197678 | A1 * | 8/2009 | Huang ................... A63H 33/26 463/32 |
| 2010/0033404 | A1 * | 2/2010 | Hamadou ............... G06T 7/004 345/8 |
| 2010/0099493 | A1 * | 4/2010 | Horovitz ................ A63H 33/00 463/31 |
| 2010/0164953 | A1 | 7/2010 | Wouhaybi et al. |
| 2010/0241403 | A1 | 9/2010 | Jakobsen et al. |
| 2010/0306712 | A1 | 12/2010 | Snook et al. |
| 2011/0065496 | A1 * | 3/2011 | Gagner ............... G07F 17/3209 463/25 |

FOREIGN PATENT DOCUMENTS

| | | |
|---|---|---|
| EP | 1047021 A2 | 10/2000 |
| EP | 1271415 A1 | 1/2003 |
| EP | 2 202 608 A1 | 6/2010 |
| GB | 2 470 072 A | 11/2010 |
| GB | 2 470 073 A | 11/2010 |
| GB | 2470072 A | 11/2010 |
| JP | 2002-159019 A | 5/2002 |
| JP | 2006-040045 A | 2/2006 |
| JP | 2007-034981 A | 2/2007 |
| JP | 2010-049690 A | 3/2010 |
| WO | 2004/104811 A2 | 12/2004 |
| WO | 2004/104811 A3 | 12/2004 |
| WO | 2009047225 A1 | 4/2009 |
| WO | 2010/029553 A1 | 3/2010 |
| WO | 2010/128321 A2 | 11/2010 |
| WO | 2010128321 A2 | 11/2010 |
| WO | 2010/150232 A1 | 12/2010 |
| WO | 2011/017393 A1 | 2/2011 |

OTHER PUBLICATIONS

U.S. Non-Final Office Action in related U.S. Appl. No. 14/119,534, dated Mar. 7, 2016.
U.S. Non-Final Office Action including references for related U.S. Appl. No. 14/119,534, dated Mar. 9, 2017.
Die made from LEGO, and CLUB. Web Archive as of LEGO, Dec. 26, 2008, and 26 on [online], [Nov. 24, 2016 search], and Dec. 26, 2008. URL: <https://web.archive.org/web/20081226153143/>.
REGO Creator Own house 5891. The REGO diary, Jan. 31, 2011[online], [Nov. 24, 2016 search]. <URL: <http://ukikusa3.blog35.fc2.com/blog-entry-490.html>.
Goto AR supporting system by teacher video superposition display to working clearance besides Michihiko, Journal of the Institute of Image Electronics Engineers of Japan, general incorporated foundation Institute of Image Electronics Engineers of Japan, vol. 39, 631:643, Sep. 25, 2010.
LEGO, AR catalog, [online] uploaded on Oct. 1, 2010, [May 27, 2016 search]. URL: <http://www.rockets.co.jp/blog/?p=1062>.
SkawaLtd, LEGO Platformer game—Mobile Augmented Reality (AR), Youtube, uploaded on Jan. 14, 2011, [online], [Nov. 24, 2016 search]. URL: <https://www.youtube.com/watch?v=1-7HnOmPYjl>.
LEGO. Signs, [online], released Apr. 2010, [May 27, 2016 search]. URL: <http://www.advertolog.com/lego/directmarketing/lego-signs-15413855/ >.
U.S. Final Office Action in related U.S. Appl. No. 14/119,534, dated Sep. 9, 2016.
JPO's Notification of Reasons for Refusal for related Japanese application No. 2014-511846, dated Jun. 1, 2016. (with English translation).
JPO's Notification of Reasons for Refusal for related Japanese application No. 2014-511845, dated Nov. 24, 2016. (with English translation).
Communication of a Notice of Opposition together with Facts and Evidence presented in support of the Opposition, issued in related European Patent Application No. 12721868.3, now European Patent Patent No. 2714222 B1, Jan. 18, 2017.
Wagner et al., "ARToolKitPlus for Pose Tracking on Mobile Devices", Computer Vision Winter Workshop 2007, St. Lambrecht, Austria, Institute for Computer Graphics and Vision, Graz University of Technology, Feb. 6-8, 2007.
International Search Report for corresponding international application No. PCT/EP2012/059469, dated Jun. 20, 2012.
International Search Report for related international application No. PCT/EP2012/059471, dated Jun. 29, 2012.

* cited by examiner

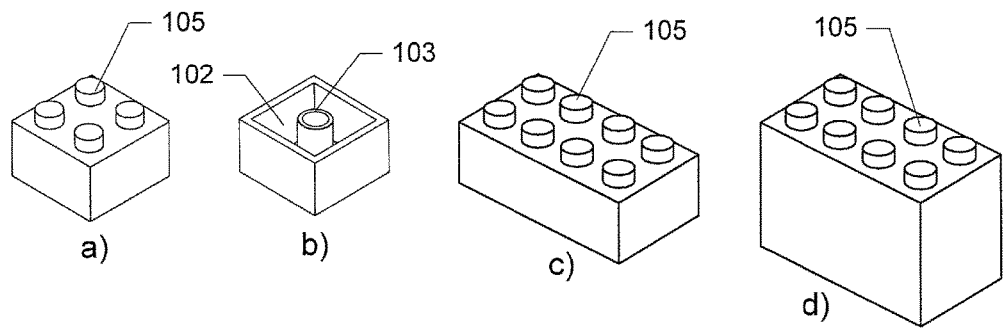
Fig. 1 - PRIOR ART
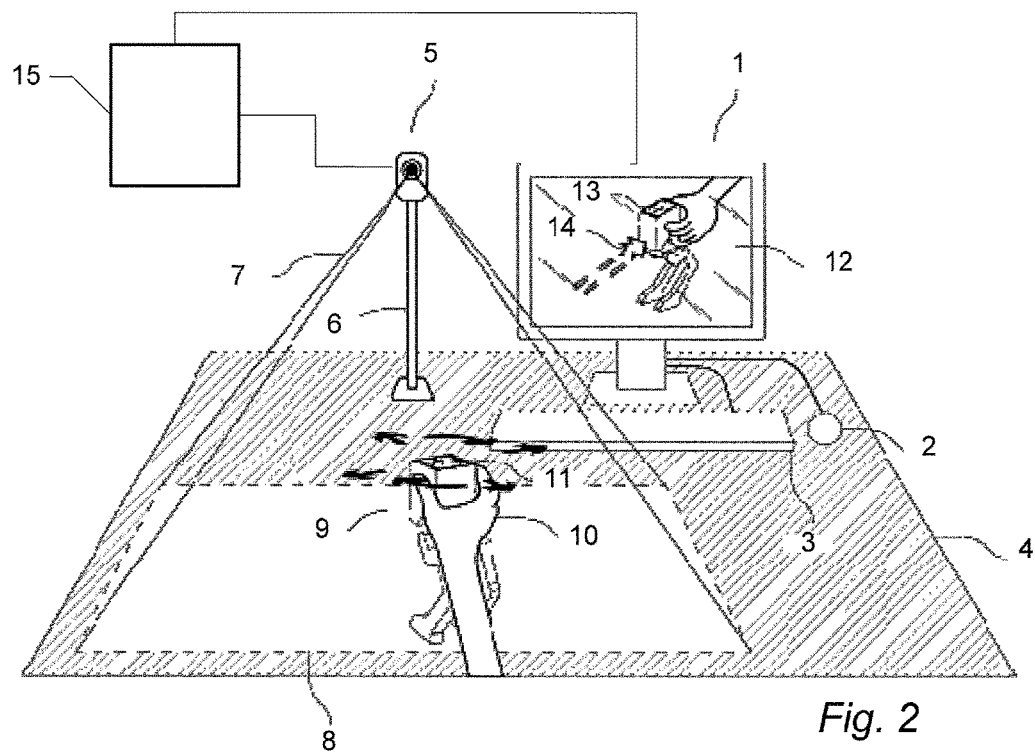
Fig. 2
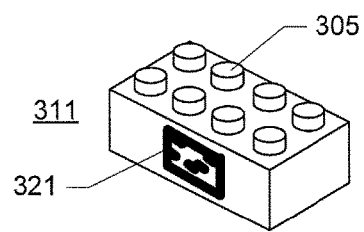
Fig. 3

TOY CONSTRUCTION SYSTEM FOR AUGMENTED REALITY

CROSS-REFERENCE TO RELATED APPLICATIONS

This application is a U.S. National Stage of International Application No. PCT/EP2012/059469, filed on May 22, 2012 and published on Nov. 29, 2012, as WO 2012/160055 A1, which claims the benefit of priority to Danish Patent Application No. PA 2011 70254, filed on May 23, 2011.

FIELD OF THE INVENTION

The invention relates to toy construction systems comprising construction elements with coupling means for releasably interconnecting construction elements.

BACKGROUND

Such toy construction systems have been known for decades. In particular, toy construction systems comprising toy construction elements having coupling means for releasably interconnecting construction elements with each other have gain high popularity. The simple building blocks have been supplemented with dedicated construction elements with a mechanical or electrical function to enhance the play value. Such functions include e.g. motors, switches and lamps.

It is generally desirable to enhance the play value of physical construction models and to allow users to interact with physical construction models via a computer. To this end, physical construction models have been disclosed that include programmable processors that accept input from sensors and can activate function elements in response to received sensor inputs, and that may be programmed by the user by means of a suitably programmed computer.

For example, WO09047225 discloses a toy construction system that comprises construction elements with coupling means for releasably interconnecting construction elements. The toy construction system further comprises a data processing system programmed provide a programming environment for generating one or more logic commands for controlling one or more function elements of the construction system. To this end the toy construction system comprises interface construction elements allowing to electrically couple a toy construction model to a computer, and allowing the computer to detect which function elements are included in the toy construction model.

Even though the above prior art system allows a user to interact with a physical construction model by means of a computer, it remains desirable to provide a closer integration of the physical construction model and a virtual reality generated on a computer.

Within the different technical field of image recognition and computer graphics, systems that utilise augmented reality (AR) have attracted increased interest. Augmented reality (AR) is a technology where a captured live view of one or more items of a physical, real-world environment is augmented by a computer-generated graphics, i.e. where a user is presented with a composite view comprising the live view and the computer-generated graphics, e.g. in the form of an overlay/superposition of the live view with the computer-graphics.

In these systems, image features are detected within the captured view, and the system may then generate a computer-generated image in dependence upon the designated image feature and superimpose the generated image on the captured view. Additionally, the superposition of computer generated images onto video images comprising predetermined augmented reality markers or tags that facilitate the detection of image features are known.

Augmented reality has been used to present to a user a computer-generated image of a toy construction model that can be built from toy construction elements sold in a box. To this end the box comprises an augmented reality marker on its outside. When the user holds the box in front of a video camera of an in-store kiosk system, the kiosk system shows the captured video image of the box, augmented with a computer-generated image of the construction model that is shown as if built on top of the box. When the user moves or rotates the box in front of the camera, the computer-generated image of the construction model follows these movements.

However, it remains desirable to provide a closer integration of the physical construction model and a virtual reality generated on a computer.

It thus remains a problem to provide a toy construction system that allows small children, e.g. pre-school children, to combine a physical toy construction model with a virtual, computer-generated play experience.

It is also generally desirable to provide a toy construction system with that is suitable for children without a detailed understanding of programming techniques, control systems, or the like.

It is also generally desirable to enhance the educational and play value of toy construction systems.

SUMMARY

Disclosed herein is a toy construction system comprising toy construction elements with coupling means for releasably interconnecting the toy construction elements. Embodiments of the toy construction system comprise one or more marker construction element with such coupling means and each having a visual appearance recognisable by an image processing system in a captured image of the marker construction element, and a data processing system comprising image capturing means, processing means, and display means, wherein the data processing system is adapted to capture an image of a toy construction model constructed from the toy construction elements;

process the captured image to detect at least a presence of at least one of the marker construction elements within the captured image;

responsive to the detected marker construction element generate a computer-generated image; and to display on said display means a composite image comprising the captured image having superimposed the generated computer-generated image.

By providing marker construction elements that comprise coupling means compatible with the toy construction system the marker construction elements may releasably be connected with other construction elements of the toy construction system. Generally, a marker construction element is a toy construction element comprising coupling means compatible with a toy construction system and a visual appearance recognisable by an image processing system in a captured image of the marker construction element, e.g. an insignia easily detectable on a captured image of the marker construction element. The coupling means may be any suitable means for mechanically connecting toy construction elements to one another, e.g. by frictional connection, a latching or snapping functions, and/or any other mechanical, non-adhesive connection. Consequently, the user may repeatedly and releasably couple one or more marker elements to a toy construction model, thereby making features of the toy construction model detectable by an AR system adapted to recognise the marker construction elements in a captured image of the toy construction model. Hence, the user may easily transform any toy construction model constructed from the toy construction elements into an AR enabled model, i.e. allowing the data processing system to generate and superimpose computer-generated images responsive to the presence and, optionally, other properties of the detected marker construction elements. The user may thus control an AR application merely by using construction elements of the toy construction system as an interface.

It is a further advantage of embodiments of the toy construction system described herein, that marker construction elements can easily be interchanged with other marker construction elements within a given toy structure thereby allowing a variety of different possible interactions within the AR system.

In some embodiments, the coupling means are adapted to define a direction of connection and to allow interconnection of each construction element with another construction element in a discrete number of predetermined relative orientations relative to the construction element; and all insignia are arranged to be visible from at least one predetermined direction relative to the defined direction of connection, when the marker construction element is coupled to at least one other toy construction element of the toy construction system. Hence, such a toy construction system allows the construction of a toy structure where the marker construction elements are interconnected with other construction elements of the toy construction system such that a proper visibility of the insignia is easily ensured, even when different marker construction elements are interchanged with each other.

In some embodiments the toy construction system comprises at least two marker construction elements, where the two marker construction elements are releasably connectable with each other via their coupling means, so as to form a composite marker element. The marker construction elements may be directly connectable with each other and/or indirectly connectable with each other, e.g. by connecting the two maker construction element with a common third toy construction element (or group of construction elements). The computer system may this be adapted to detect the composite marker element and to generate a computer-generated graphics selectively responsive to the detection of the composite marker element. Hence, by interconnecting marker construction elements in different ways the user may construct a variety of new, composite marker elements from a relatively small number of basic marker construction elements, thereby increasing the variability of possible augmented reality scenarios that may be created by the computer responsive to the detection of such composite markers. For example, a set of marker construction elements may function much like letters of an alphabet forming a word recognised by the AR system, e.g. according to a predetermined code.

In one embodiment, the toy construction system comprises a dice having replaceable faces, each face being formed by a construction element of the toy construction system, and wherein one or more of the marker construction elements have a shape and size and coupling means configured so as to allow coupling the marker construction element to the dice, and wherein the marker construction element is configured to form a face of the dice, where the marker construction element comprises a visually detectable insignia on a part of its surface forming a face of the dice. Embodiments of the dice may be a dice for a game, such as a board game, a card game or some other game. The gaming dice may comprise a body part comprising at least six sides on which the gaming dice may sit steadily when on a plane support, and wherein at least one or more of such sides is/are provided with coupling means for mounting of an indicia-carrying marker element. In some embodiments at least one side of the dice may be provided with coupling means for simultaneous mounting of at least two indicia-carrying marker elements. Consequently, the computer system may detect the marker element(s) and create respective responses thus enabling further options for new kinds of games or more options for different outcomes when the gaming dice is thrown.

In some embodiments, the coupling means define a regular grid, such as a three-dimensional (3D) grid, restricting a position of the constructing elements in a toy construction model to discrete positions on said regular grid. In particular, the coupling means may comprise a plurality of coupling elements positioned on grid points of a three dimensional regular grid, e.g. defined as a plurality of planar grids arranged parallel with each other and at regular inter-plane distances. The intrinsic, discrete coordinate system defined by the coupling means facilitates the detection of spatial relationships between different marker elements, and/or between a marker construction element and another element or feature of the toy construction model. In particular, when the visually detectable features of the marker construction elements are positioned at uniform positions relative to the coupling means of the marker construction elements, a reliable and accurate determination of the position of the AR markers within a toy construction model is facilitated.

The marker construction elements may each comprise a visually detectable feature, such as an insignia. In particular, when the construction elements have at least one property that may assume one of a discrete and finite set of values (e.g. a limited number of distinct colors), such property may be used as easily detectable AR marker where the property is detectable and interpretable by the AR computer system. For the purpose of the present description, the visual feature of the marker construction element recognisable by the AR system will also be referred to as an AR marker.

An AR marker, e.g. an insignia, may define one or more directions, e.g. relative to an intrinsic coordinate system or regular grid of the toy construction system as described herein, thus allowing an AR system to detect an orientation of the AR marker, e.g. an orientation relative to the camera position and/or relative to another AR marker.

In some embodiments, each marker construction element includes a computer-recognisable insignia, e.g. on an outer surface of the marker construction element, e.g. a computer-recognisable barcode, matrix code, and/or another suitable 2D symbol.

In some embodiments, a marker construction element may comprise two different AR markers and a movable element, e.g. a hinged element, a rotatably arranged element, or the like, that may be moved between a first and a second position, such that the movable element selectively obstructs a respective one of the markers from view when positioned in the first and second position, respectively. Hence, movement of the component causes different markers to become visible, thus allowing the AR computer system to detect the state of the movable component.

Embodiments of the toy construction system allow a user to construct a large variety of toy construction models facilitating AR functionality in a uniform and well-structured manner and with a limited set of different construction elements. For example, a toy construction system may be provided as a toy construction set comprising a number of marker construction elements having different insignia. Optionally, such a toy construction set may comprise one or more of the following: an image capturing device, conventional construction elements, an instruction manual, a computer-readable medium having stored thereon computer program means adapted to cause a computer to perform the steps of embodiments of the method described herein, and/or the like.

It is noted that the toy building sets may comprise further types of construction elements, such as active and/or passive construction elements with our without capabilities of performing or controlling actions/functions, such as conventional building blocks known in the art.

The different aspects of the present invention can be implemented in different ways including the toy building system described above and in the following and corresponding methods, apparatus, and product means, each yielding one or more of the benefits and advantages described in connection with at least one of the aspects described above, and each having one or more preferred embodiments corresponding to the preferred embodiments described in connection with at least one of the aspects described above and in the following and/or disclosed in the dependant claims. Furthermore, it will be appreciated that embodiments described in connection with one of the aspects described herein may equally be applied to the other aspects.

In particular, a method is provided for generating an image of a toy construction model. Furthermore, a computer program product is provided comprising program code means adapted to cause, when executed on a data processing system, a data processing system to perform the steps of the method described herein.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the Internet or other computer or communication network. In particular, an embodiment of a toy construction set may include toy construction elements including one or more marker construction elements as described herein, and installation instructions for installing a computer program product on a suitable data processing system.

A data processing system may include any suitable computer or other processing device, such as a PC, a portable or handheld computer, a PDA, smart phone, and/or the like.

Embodiments of the data processing system include image capturing means, such as a camera, e.g. a video camera, or any other suitable device for obtaining an image of a toy construction model.

Embodiments of the data processing system include image processing means e.g. processing means configured to perform one or more image processing operations, such as feature detection operations, on a captured image.

Here and in the following, the terms processing means and processing unit are intended to comprise any circuit and/or device suitably adapted to perform the functions described herein. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Embodiments of a toy construction set described herein thus allow a user to construct a large variety of toy models and to add computer-recognisable marker elements in an easy and accurately reproducible way that allow a suitably programmed computer to capture an image of the toy model and to augment or replace the captured image with computer-generated images responsive the recognised marker construction elements.

Generating computer-generated images responsive to the detection of an AR marker may comprise performing further functionality triggered by the detection of the AR marker, e.g. triggering events such as an activity in a virtual environment, a behaviour of one or more virtual characters, etc.

Furthermore, according to some embodiments, the user may control the generation and display of the computer generated images by coupling suitable marker construction elements to the toy construction model and/or by manipulating at least parts of the toy construction model including such marker construction elements.

BRIEF DESCRIPTION OF THE DRAWINGS

FIGS. 1 a-d each show a prior art toy building brick,

FIG. 2 shows an embodiment of a toy construction system as disclosed herein.

FIGS. 3 and 4 schematically illustrate examples of marker construction elements.

DETAILED DESCRIPTION

Figure 4:
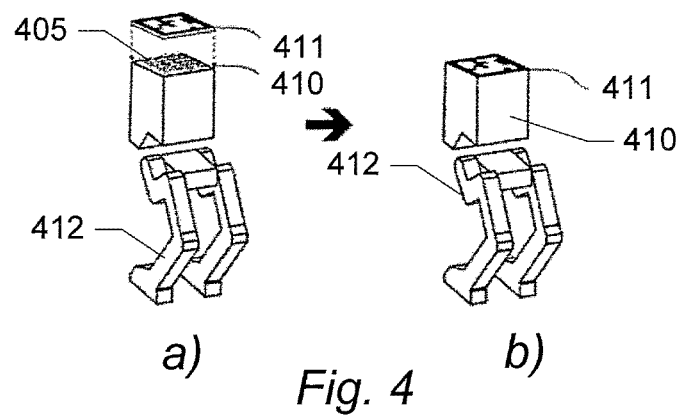

Various aspects and embodiments of toy construction systems disclosed herein will now be described with reference to toy construction elements in the form of bricks. However, the invention may be applied to other forms of construction elements used in toy construction sets.

FIGS. 1 a-d each show a prior art toy building brick with coupling studs 105 on their top surface and a cavity 102 extending into the brick from the bottom. FIGS. 1a-b show a top side of a toy building brick, while FIG. 1b shows the bottom side of the same toy building brick. FIGS. 1c-d show examples of similar toy building bricks of different sizes. Such construction elements are widely available under the trade name LEGO. The cavity has a central tube 103, and coupling studs of another brick can be received in the cavity in a frictional engagement as disclosed in U.S. Pat. No. 3,005,282. The building bricks shown in the remaining figures may have this known type of coupling means in the form of cooperating studs and cavities. However, other types of coupling means may also be used. The coupling studs are arranged in a square planar grid, i.e. defining orthogonal directions along which sequences of coupling studs are arranged. Generally, such an arrangement of coupling elements allows the toy bricks to be interconnected in a discrete number of orientations relative two each other, in particular at right angles with respect to each other. It will be appreciated that other geometric arrangements of coupling elements may result in different orientational constraints. For example, the coupling elements may be arranged in a triangular, regular grid allowing a building element to be placed on another building element in three different orientations.

FIG. 2 shows an embodiment of a toy construction system as disclosed herein. The system comprises a computer 15, a display 1, a video camera 5, a toy construction model 10 constructed from at least one toy construction element and at least one marker construction element 11 of a toy construction system as described herein. The computer may be a personal computer, a desktop computer, a laptop computer, a handheld computer, a game console, a handheld entertainment device, or any other suitably programmable computer. The display 1 is operatively coupled to (e.g. integrated into) the computer 15, and operable to display, under the control of the computer 15, a video image. It will be appreciated that the system may comprise further peripheral computer devices operatively coupled to the computer 15, such as a keyboard, a mouse 2 or other pointing device, and/or the like. The video camera 5 is operable to capture video images of the environment in which the video camera is situated, e.g. of a field of view 7 including a visible surface area 8 of a surface 4, e.g. a desktop, a floor, or the like. Hence the visible surface area 8 is the projection of the field of view of the video camera on the surface 4. The video camera is operatively coupled to (e.g. integrated into) the computer 15 and operable to forward the captured video image to a processing unit of the computer 15, e.g. via a suitable input interface of the computer 15. For example, the video camera may be a webcam connected to or integrated into computer 15. In the example of FIG. 2, the video camera is positioned on a camera support 6, such as a tripod, supporting the camera at a predetermined height above the surface 4.

Here, the video camera 5 captures video images of the environment 8 in which the video camera is situated and forwards the captured video images to the computer 15. For example, the environment in which the video camera is situated may comprise the toy construction model 10. In addition to the toy construction model 10, the environment may comprise further objects such other household objects, toys, or the like.

The computer images are then rendered by the computer 15 on the display 1. Therefore, a user may move the toy construction model 10 around and/or otherwise manipulate the toy construction model within the field of view of the video camera 5 and view live video from the video camera 5 of the toy construction model. Alternatively or additionally, the user my change the position and/or orientation of the video camera so as to capture images of a (e.g. stationary) toy construction model from different positions. Additionally, the computer may be operable to store the captured video images on a storage device such as a hard disk of the computer, and/or forward the captured video to another computer, e.g. via a computer network. For example, the computer may be operable to upload the captured video images to a website.

The computer 15 is suitably programmed to operate in an augmented reality mode in which the computer performs image processing on the captured video image so as to detect one or more predetermined augmented reality markers or tags within the captured video image. Responsive to the detected AR marker(s), the computer may be programmed to generate a modified video image, e.g. a video image formed as the captured video image having a computer-generated image superimposed, or a video image wherein at least a part of the captured video image is replaced by a computer-generated image. The computer 15 is operable to display the modified video image on the display 1. For the purpose of the present description, a computer operable to implement AR functionality operatively connected to a video camera and a display will also be referred to as an AR system.

Image processing methods for detecting AR markers and for generating modified video images responsive to detected AR markers are known as such in the art (see e.g. Daniel Wagner and Dieter Schmalstieg, "ARToolKitPlus for Pose Tracking on Mobile Devices", Computer Vision Winter Workshop 2007, Michael Grabner, Helmut Grabner (eds.), St. Lambrecht, Austria, February 6-8, Graz Technical University).

In the example of FIG. 2, the physical toy construction model 10 comprises a toy construction element 9 having connected to it a marker construction element 11. The marker construction element 11 has an insignia in the form of a two-dimensional machine readable code on its top surface.

The computer 15 is operable to detect the presence of the two-dimensional machine readable code in the captured image. Furthermore, the computer 15 may determine a relative position and orientation of the two-dimensional machine readable code relative to the position of the video camera 15.

Accordingly, the computer 15 may modify the captured image of the toy construction model resulting in a modified video image 12 displayed on the display 1. In this example, the modified image shows the captured image 13 of the toy construction model and computer-generated image elements 14 superimposed the captured image. The computer generates the computer-generated image elements at a position and orientation within the video image 12 as determined from the detected position and orientation of the AR marker of the marker construction element 11.

As the user manipulates the physical toy construction model 10 within the projection area 8 of the video camera, e.g. by moving and/or rotating the physical model, the computer 15 tracks the position and orientation of the insignia of the marker construction element 11 of the physical toy. The computer 15 displays the live video feed of the video camera (mirrored mode) on the display 1 and adds, responsive to the detected position and orientation of the insignia, augmented reality special effects to the live video feed.

FIGS. 3 and 4 schematically illustrate examples of marker construction elements.

FIG. 3 shows a toy construction element in the form of a toy building brick 311 similar to the building brick of FIG. 1c, i.e. a building brick comprising coupling studs 305 arranged in a planar square grid on the top surface of the toy building brick. The toy building brick also comprises one or more cavities on its bottom surface (not shown in FIG. 3) for receiving and frictionally engaging coupling studs of another, similar toy construction brick. The toy building brick comprises, on one of its side faces, an augmented reality marker 321 in the form of a 2D bar code.

It will be appreciated that other forms of AR markers may be used instead of a 2D bar code. Generally, the AR marker may be any object that is relatively easy to automatically distinguish within the captured video images using known image recognition methods. Where the AR marker is detected using image recognition methods, the AR marker may be, for example, a three dimensional object such as a cube or a cylinder or it may be a two dimensional marker such as a square or a circle. Typically, the AR marker comprises an easily distinguishable pattern such as a black and white square although other methods may be used for marker recognition such as using a particular colour or pattern of colours and the like.

The AR marker may include one or more elements allowing the computer to detect a position and/or an orientation of the AR marker. For example, the AR marker may comprise two or more intersecting lines. Additionally or alternatively, the AR marker may comprise visual elements for encoding information, thus allowing the computer to identify and distinguish different types of markers and to generate computer-generated images selectively responsive to specific types of markers.

The AR marker may be arranged in a uniform manner relative to the coupling means, i.e. to the coupling studs on the top surface and/or to the coupling cavity in the bottom. For example, the AR marker may define a direction parallel or normal to the planar grid defined by the coupling means. This makes the marker bricks interchangeable, and in a toy structure built from bricks as in FIGS. 1-3, several marker bricks can be used interchangeably, and a particular marker brick can be used in several constructions. A toy construction system may comprise several of such marker bricks having different insignia applied to it and causing the computer system to generate different computer-generated images. Nevertheless, if all marker bricks include the insignia at uniform positions, such marker bricks may easily be interchanged within a toy construction built from the building bricks described herein.

When the insignia is located on a part of the surface of the marker construction element such that the surface part comprising the insignia does not have any coupling means, the insignia is less likely to be unintentionally obstructed by other construction elements coupled to the marker construction element. A marker construction element may comprise a plurality of insignia, e.g. on different faces (or otherwise on different portions of the surface) of the toy construction element.

FIG. 4 illustrates how a marker construction element may be coupled to another toy construction element of a toy construction model. In this example, the toy construction model comprises toy construction elements 410 and 412 and a marker construction element 411. FIG. 4a shows the individual constructions elements, while FIG. 4b shows the marker construction element 411 releasably coupled to the construction element 410. To this end, the toy construction element 410 comprises coupling studs 405 on its top surface as described in connection with FIG. 1. The marker construction element 404 comprises cavities on its bottom surface (not shown in FIG. 4), allowing it to frictionally engage the coupling studs 404.

Hence, the user may connect a marker construction element comprising an AR marker to a constructed toy model so as to facilitate tracking the toy model in 3D space and to superimpose virtual graphics and effects, thereby providing the physical toy with virtual attributes and allow the constructed toy model to become a part of an AR application. As in the example of FIG. 3, the insignia of the marker construction element 411 is located on a surface of the marker construction element that does not comprise coupling elements.

FIGS. 5a-g illustrate examples of composite marker construction elements, i.e. a plurality of marker construction elements directly or indirectly connected with each other by means of the coupling means of the toy construction system, e.g. in a predetermined spatial relationship with each other. Generally, composite marker construction elements allow the user to create a large set of distinct objects, each identifiable by one of a large number of unique AR markers. In particular, the large number of unique AR markers may be created from a relatively limited set of individual marker construction elements, because combining a smaller set of markers through a building system dramatically increases the total number of combinatorial possibilities.

FIG. 5a shows an example of a human-like figure constructed from three marker construction elements, namely an element 511 resembling a head of the figure, an element 512 resembling the torso of the figure, and an element 513 resembling the legs of the figure. The construction elements are provided with coupling elements allowing a head and legs to be releasably coupled to the torso. The head, torso and legs may include insignia, e.g. in the form of facial features of the head and closing features of the torso and/or the legs. When presented to the video camera of an AR system, the AR system may thus detect the features of the head, the torso and the legs, e.g. as schematically illustrated in FIG. 5b by detected features 521, 522, 523 of the head, torso and legs, respectively. Hence, by combining different heads, torsos, and legs, a vast variety of combinations of AR markers can be created. Depending on which figure is detected by the AR system, the AR system may respond with different computer-created images, thereby allowing for a vast variety of interactions.

FIGS. 5c and d illustrate a similar composite marker construction element, constructed from toy building bricks as shown in FIG. 1c. The toy building bricks 531, 532, and 533 have different colors, e.g. red, white and blue, respectively. When stacked on top of each other and interconnected by their respective coupling means, the building bricks define a sequence of colors that may thus be detected by an AR system. By changing the order of the colors, as illustrated in FIG. 5d, different unique composite AR markers may be constructed from only three different marker construction elements.

FIG. 5e shows a similar example of a composite marker element, including toy building bricks 541, 542, 543 similar to the one shown in FIG. 3 having AR markers in the form of insignia on their side faces.

FIGS. 5f-g show jet another example of a composite marker element. In this example, the composite marker element comprises a base building brick 550, e.g. a brick similar to the brick of 1c, but with a larger number of coupling elements on its top surface. The composite marker element further comprises marker construction elements 551, 552, 553 connected to the base building brick 550. Hence, in this example, the marker construction elements 551, 552, and 553 are indirectly coupled to each other in a rigid configuration so as to form a composite marker construction element. To this end, the marker construction elements have coupling elements, e.g. cavities, on their bottom surface that can engage corresponding coupling elements, e.g. studs, on the top surface of the base building brick 550. Each marker construction element has an insignia on its top surface, in this example letters of the Roman alphabet. As the marker construction elements are arranged side by side, they define a sequence of insignia detectable by the AR system.

As illustrated by FIG. 5g, the insignia of the marker construction elements may define an orientation in a plane, and individual marker elements may be rotated with respect to each other, thus further increasing the degrees of freedom of defining multiple codes, as the AR system may detect the orientation of the respective AR markers relative to each other and/or relative to another feature of the toy construction model.

Figure 5:
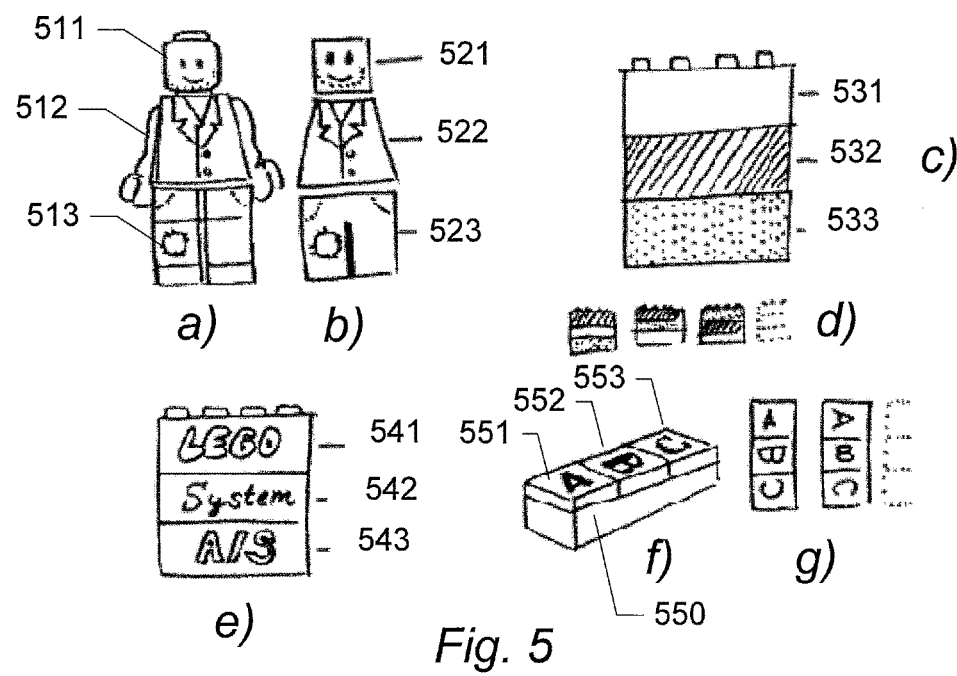
FIGS. 5a-g illustrate examples of composite marker construction elements.

Hence, in the examples of FIG. 5, individual marker construction elements, each comprising a visually detectable feature distinct from the other marker construction elements, are interconnected by means of their coupling elements, so as to define a sequence of visually detectable features. Each distinct sequence of visually detectable features may thus define a composite AR marker. For example, the individual visually detectable features may be detected by the AR system as symbols of a code, and a sequence of detected symbol may be decoded by the AR system so as to obtain information encoded by the sequence of symbols. In some embodiments, the system may use known error detection and/or error correction techniques for making the code more robust against detection errors.

Figure 6:
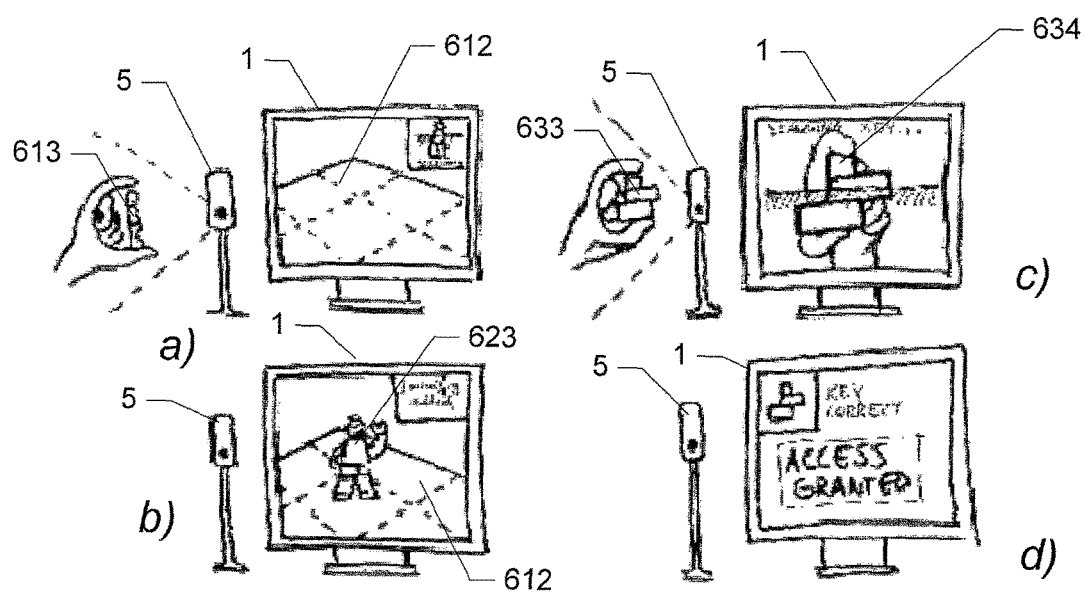
FIGS. 6 and 7 illustrate examples of uses of composite marker construction elements.
Figure 7:
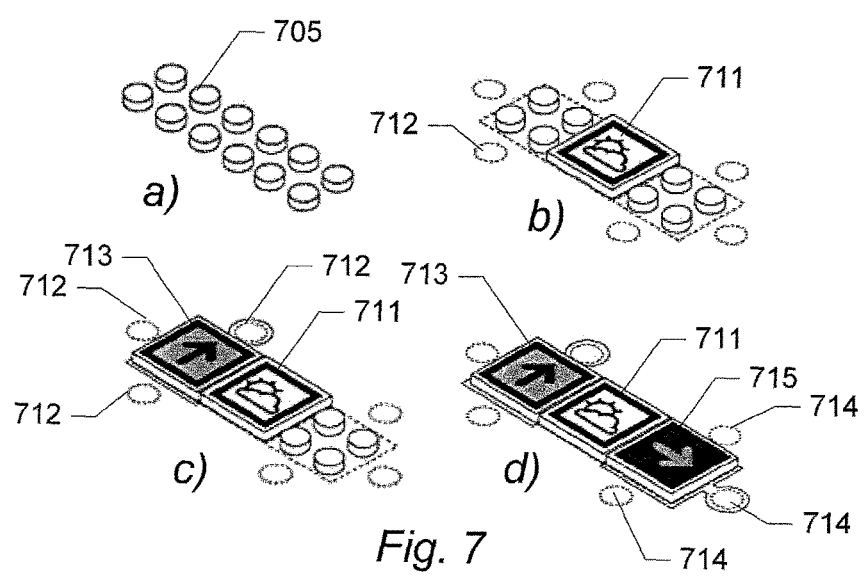

FIGS. 6 and 7 illustrate examples of uses of composite marker construction elements.

FIGS. 6*a-b* illustrate a use of the marker construction elements of FIGS. 5*a-b*. FIG. 6*a* shows the video camera 5 and the display 1 of an AR system. Initially, the display shows a scene 612. When the user presents the human-like FIG. 613 to the video camera 5 of the AR system, the AR system may detect the combination of head, torso, and legs, determine the corresponding combined AR marker, and modify the displayed image responsive to the detected combined marker. For example, the AR system may generate an image of a FIG. 623 within the scene 612. The figure may resemble the physical FIG. 613 and may be animated to show a behaviour (e.g. friendly, angry, sad, etc.) determined by the AR system responsive to the detected combined AR marker.

FIGS. 6*c-d* illustrate a use of the marker construction elements of FIG. 5*c* or 5*e*. FIG. 6*c* shows the video camera 5 and the display 1 of an AR system. When the user presents a composite marker element 633 to the video camera 5 of the AR system, the AR system may detect the combination of marker construction elements. Optionally, the AR system may determine the relative position and/or orientation of the individual markers forming the composite marker element relative to each other. The AR system may then respond responsive to the detected composite marker element. For example, as illustrated in FIG. 6*d*, the AR system may interpret the combined marker element as an access code, e.g. for granting access to advanced features of the AR system, to a predetermined level of a gaming application, etc. If the presented combined marker element matches a stored access code, the user is granted access; otherwise access may be denied.

FIGS. 7*a-d* illustrate another example of a use of a combined marker construction elements, e.g. the marker construction elements of the type shown in FIGS. 5 *f-g*. FIG. 7*a* schematically illustrates coupling elements 705 of a toy construction element, e.g. coupling studs as described in connection with FIG. 1. The coupling elements are arranged in a planar square grid. FIG. 7*b* illustrates a marker construction element 711 coupled to the toy construction element by means of the coupling elements. The arrangement of the coupling elements allow the marker construction elements to be connected to another toy construction element in four distinct orientations. In the example of FIG. 7, the marker construction element 711 has an insignia defining a direction. In this specific example, the insignia resembles an image of a cloud and a sun, i.e. the image defines an "up" direction. FIG. 7*c* illustrates a marker construction element 713 coupled to the coupling elements 705 adjacent to the marker construction element 711. Marker construction element 713 also has an insignia defining a direction, in this example resembling an arrow. The marker construction element 712 may be placed relative to the marker construction element 711 with its direction pointing to four different orientations relative to the direction defined by the construction element 711. Three of these orientations are illustrated in FIG. 7 by dotted circles 712. Similarly, FIG. 7*d* illustrates another marker construction element 715 coupled to the coupling elements 705 adjacent to the marker construction element 711. Marker construction element 715 also has an insignia defining a direction, in this example resembling an arrow. The marker construction element 715 may be placed relative to the marker construction element 711 with its direction pointing to four different orientations relative to the direction defined by the construction element 711. Three of these orientations are illustrated in FIG. 7 by dotted circles 714. The combined marker construction element comprises elements 711, 713, and 715, thus defining a sequence of AR markers arranged in a sequential order and having detectable orientations relative to each other. When presented to the camera of the AR system, the AR system may detect the three marker construction elements, their relative positions and their relative locations. Consequently, with only two different types of marker construction elements (the "cloud and sun" type of marker and the "arrow" marker), a large number of different composite markers may be constructed by coupling the marker elements to a toy construction element in different relative orientations and/or positions (e.g. different sequential orders).

For example, when generating computer generated image elements, the AR system may generate image elements resembling weather phenomena, e.g. clouds, rain, sun, snow, etc. The AR system may thus be controllable to display weather phenomena responsive to the orientation of the marker construction elements 711, 713, and 715. For example, when the AR system detects that a user has connected marker construction element 711 to a toy construction model, the AR system may initiate a function for controlling the display of image elements resembling weather phenomena.

Placement of the marker construction element 713 with its arrow pointing up (relative to the marker construction element 711) may cause the AR system to initiate a function for controlling display of image elements resembling a sun. A placement with the arrow pointing left or down may initiate display functions for displaying 'rain' and 'snow,' respectively.

Placement of the marker construction element 715 with its arrow pointing right (relative to the marker construction element 711) may cause the AR system to initiate a function for controlling display of the selected image element (in this example "sun") with degree "medium" (e.g. partly covered by clouds). A placement with the arrow pointing up or down may initiate display functions for selected image element to a higher or lower degree (e.g. a lot of sun or a little sun), respectively.

Generally, when the coupling means of the marker construction elements only allow coupling of a marker construction element to another toy construction element (e.g. another marker construction element) of the toy construction system in a predetermined number of discrete relative positions and/or discrete relative orientations with respect to the other toy construction system, the AR system may be configured to detect the relative position and/or orientation of at least two marker construction elements with respect to each other, and to created a computer-generated image feature responsive to the detected relative position and/or orientation. For example, a limited number of discrete relative positions and orientations may be provided when coupling elements of the marker construction elements define a planar, regular grid, and when the coupling elements allow coupling of toy construction elements at a predetermined number of angles relative to each other within one of said planes.

Figure 8:
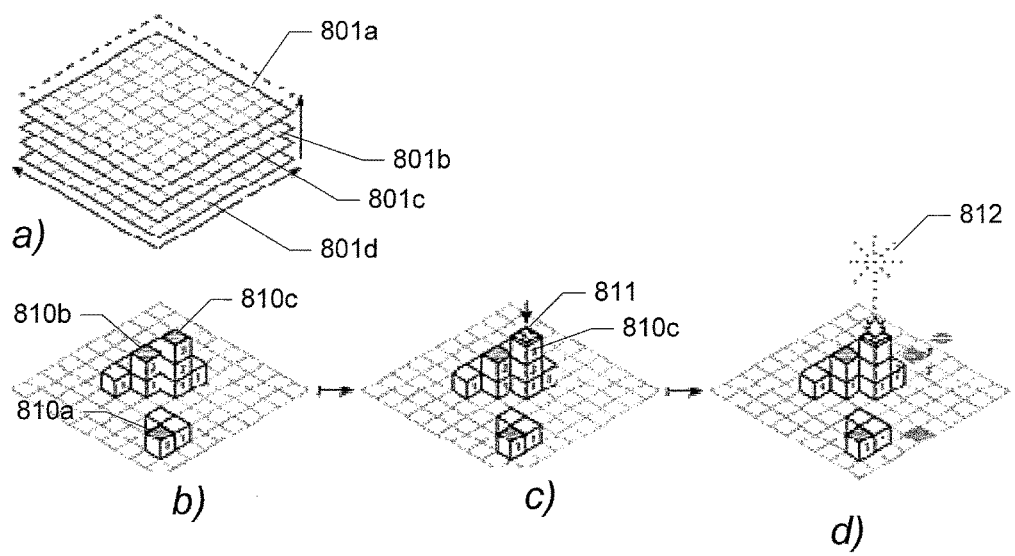
FIGS. 8a-d illustrate an example of a toy construction system defining a regular grid.

FIGS. 8a-d illustrate an example of a toy construction system defining a regular grid. FIG. 8a illustrates a 3D regular grid where each grid point of the grid defines a valid position of a connection element within a toy construction model. It will generally be appreciated that not all grid points of the grid actually need to be populated by coupling elements; however, in some embodiments all coupling elements are positioned on grid points of the regular grid. In particular, in the example of FIG. 8a, the grid points are arranged in parallel planes 801a-d wherein grid points within a plane define positions of connection elements on a surface of one or more toy construction element, e.g. the coupling studs of the building bricks shown in FIG. 1. The distance between the parallel planes defines a distance between surfaces of construction elements having coupling elements. For example, in some embodiments, construction elements have a height that is equal to (or an integer multiple of) the distance between two neighbouring planes of the grid.

When the toy construction system defines a regular grid, the position and/or orientation of the AR markers may be accurately determined by the AR system relative to the grid. Furthermore, tracking markers that are attached to building elements in the grid of the building system provides more information about how the tagged elements are used in the model. Events in the application may selectively be triggered if the tags are build correctly, i.e. fit in the grid.

An AR marker may thus cause the AR system to initiate creation of computer generated image elements responsive to a predetermined position and/or orientation (and/or other positional constraint) of the AR marker relative to the grid. The AR application can thus react to how the physical elements are used in the building system.

FIGS. 8b-d illustrate an example of such a position-sensitive trigger function.

FIG. 8b schematically illustrates an example of a toy construction model constructed from toy construction elements with coupling elements defining a 3D grid as shown in FIG. 8a. The top surfaces of the construction elements may thus only be located at predetermined heights relative to an origin of a suitable coordinate system. For example, construction element 810a of FIG. 8b is located at a first height, while construction element 810b is located at a second height, and construction element 810c is located at a third height.

The top surfaces of construction elements 810a-c may be detectable by the AR system and function as virtual buttons. If a user, as illustrated in FIG. 8c, connects a marker construction element 811 to one the construction elements being interpreted by the AR system as virtual buttons, detection of the marker construction element may cause the AR system to trigger a virtual action, e.g. displaying a computer-generated image element 812 at the location of the virtual button as illustrated in FIG. 8d. It will be appreciated that, in some embodiments, the triggered action may also depend on an insignia of the marker element 812 and/or on other conditions, e.g. that marker elements are connected to two of the virtual buttons.

It will be appreciated that the AR system may be adapted to determine the locations of grid points of the intrinsic discrete coordinate system defined by a toy construction model positioned in the field of view of the camera of the AR system. For example, the AR system may detect positions of coupling elements and/or positions of AR markers located in a predetermined spatial relationship to coupling elements of a corresponding marker construction element. Based on the determined grid locations, the AR system may determine the position and/or orientation of the regular grid relative to the camera position. The AR system may even create a regular image grid from the detected physical grid, e.g. such that the image grid has grid points coinciding with the images of the physical coupling elements. The AR system may then use the image grid to generate an image feature of the computer-generated image at a location relative to the detected image grid.

Figure 9:
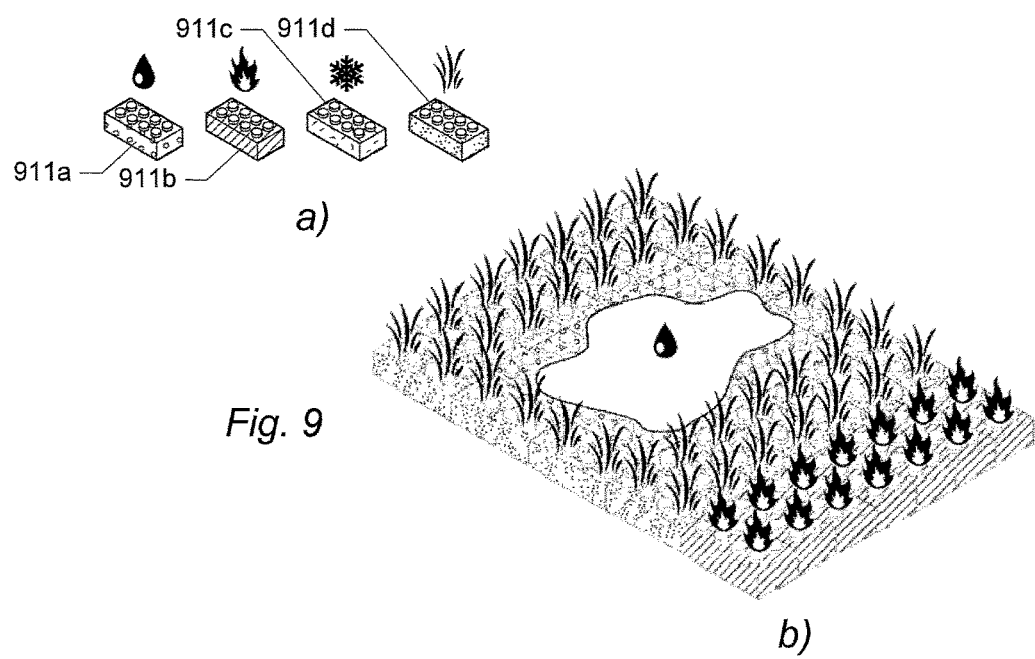
FIGS. 9 and 10 illustrate examples of uses of examples of a toy construction system as described herein.
Figure 10:
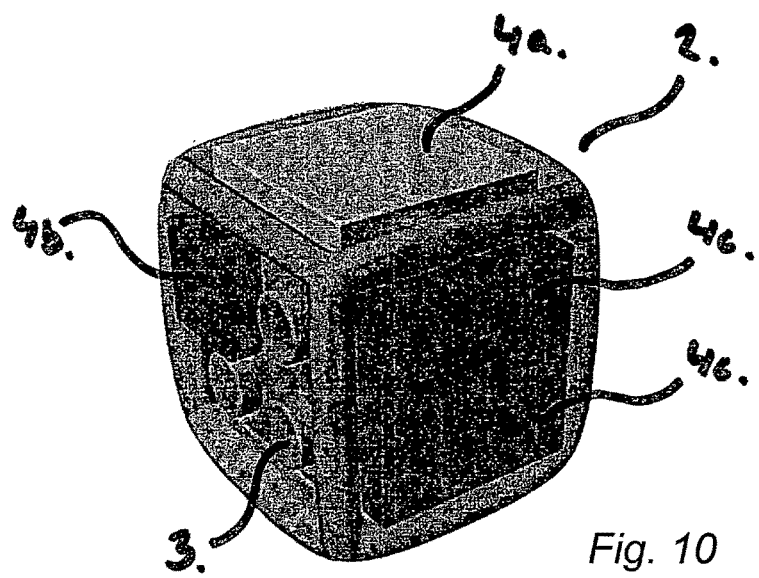

FIGS. 9 and 10 illustrate examples of uses of examples of a toy construction system as described herein.

FIG. 9 shows toy construction elements 911a-911b of the type shown in FIG. 1. In this embodiment, the different construction elements have respective insignia, different color, and/or another distinguishable visual feature. Each of the toy construction element, when detected by the AR system within a toy construction model, triggers a predetermined action. For example, in the example of FIG. 9, each of the construction elements 911a-911d represents a different type of landscape or environmental phenomena, such as grass, water, snow, fire, etc. When detected by the AR system, each construction element may thus be augmented by the AR system by displaying corresponding image elements representing grass, water, fire, snow, respectively. This allows a user to build a landscape by means of the construction elements, e.g. as illustrated in gig. 9b.

It will be appreciated that the marker construction elements may also trigger further actions within the AR system. For example, the landscape of FIG. 9b may be used in the AR system as a landscape within which a game is performed, i.e. the user may build his/her own levels of a computer game by using physical building elements, FIG. 10 shows a gaming dice comprising a body member 2 with six identical sides, and wherein each of these sides is configured to be essentially square to the effect that the probability of the gaming dice coming to rest on a given side following throw of the gaming dice is equally high for all the sides of the gaming dice.

The sides of the body member 2 are essentially identical and thus a throw of such gaming dice will not in itself be meaningful, it not being possible for the user or an AR system to distinguish between the outcomes of such throw of the dice. According to this example of a dice, four couplings studs 3 are therefore provided on each of the sides of the body member 2 and are arranged in a square pattern to the effect that the coupling studs 3 form corners in a square, and the coupling studs 3 are configured such that it is possible to mount building elements from a toy building system on the coupling studs 3 to the effect that the sides of the gaming dice are able to change nature upon mounting of different such building elements on the sides of the gaming dice.

On the undersides of the building elements 4a, 4b, 4c, coupling flanges are configured that, following mounting of the building element 4a, 4b, 4c on the gaming dice, is in frictional abutment on the outer side of the coupling studs 3 on the gaming dice. There being ample opportunities for configuring such coupling flanges in different ways, and the person skilled in the art being able to freely point to such option.

By mounting different building elements on the gaming dice, it is thus possible to impart to each side of the gaming dice its own nature if the elements that are mounted on the gaming dice vary in number, shape or appearance as such.

FIG. 10 shows the same gaming dice wherein at least on the three visible sides of the gaming dice, building plates 4a, 4b, 4c from a toy building system are mounted. On the one side that faces upwards, a square building plate 4a is thus mounted that covers all four coupling studs on the side to the effect that the building plate does not leave space for mounting of further building elements on that side. On the two other visible sides of the gaming dice, a single square building plate 4b is mounted that covers precisely one single one of the coupling studs 3 on the one side, and, on the other side, two rectangular building plates 4c are mounted that each covers precisely two coupling studs 3 on that side, respectively, to the effect that the two rectangular building plates 4c do not leave space for further mounting of building plates on that side.

Hence, different AR markers may be associated with different faces of the gaming dice. Throwing of the dice within the field of view of the video camera of an AR system as described herein may thus cause the AR system to detect the AR marker e.g. on a face of the dice, and to present a corresponding outcome of a virtual game. As different AR markers may be associated with the faces of the dice, the AR system may implement different games without the need for reprogramming or otherwise reconfiguring the AR system, but simply by replacing the AR marker construction elements connected to respective faces of the dice.

Figure 11:
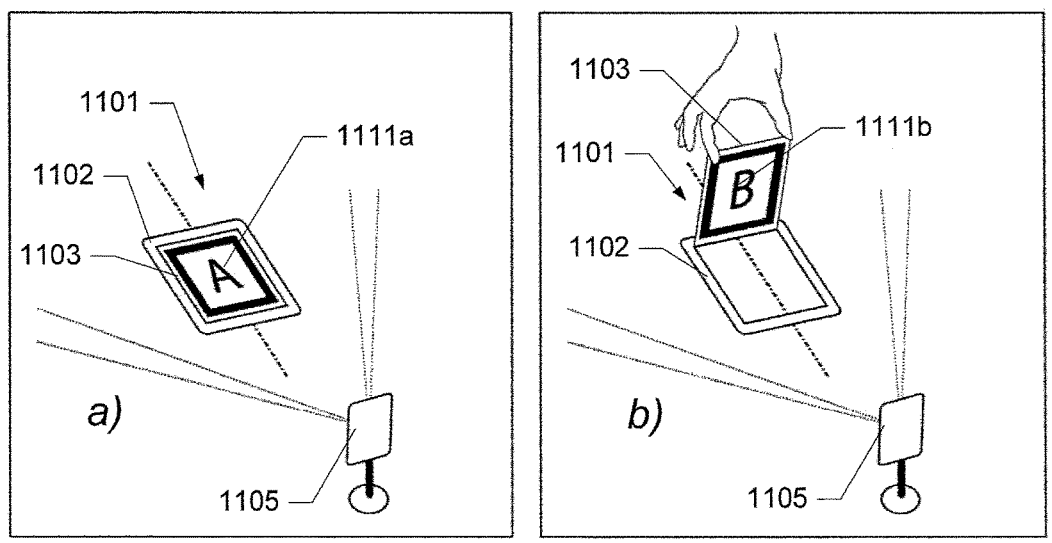
FIGS. 11 a-b illustrate an example of a marker construction element comprising two selectively visible AR markers.

FIGS. 11 a-b illustrate an example of a marker construction element comprising two selectively visible AR markers. FIGS. 11 a-b schematically show a toy construction model 1101 comprising a door 1103 hinged to a frame 1102 to allow the door 1103 to pivot between a closed position as shown in FIG. 11a and an open position as shown in FIG. 11b. The frame and the door may be releasably interconnectable with each other, e.g. by snapping the hinges into place. Alternatively or additionally, the frame 1102 may comprise one or more coupling elements (not explicitly shown in FIG. 11) allowing the frame and door structure to be connected to a larger toy construction model, e.g. so as to provide a movable barrier covering an opening in a toy structure. The door 1103 has coupling elements (not explicitly shown in FIG. 11) on both sides allowing different marker construction elements 1111a and 1111b to be connected to the respective sides of the door. For example, the construction marker elements 1111a and 1111b may be elements similar to element 411 of FIG. 4a. The marker construction elements 1111a and 1111b comprise different insignia on their respective faces pointing away from the door. In the example of FIG. 11, marker construction element 1111a comprises a square frame and the letter 'A' inside the frame, while marker construction element 1111b comprises a square frame and the letter 'B' inside the frame. Hence, insignia 1111a is visible when the door is in its closed position, while insignia 1111b is visible when the door is in its open position. When the structure 1101 is positioned in the field of view of a video camera 1105 of an AR system as described herein, the AR system may thus detect which one of the insignia is visible, thereby detecting whether the door is in the open or in the closed position, and to generate computer-generated images responsive to the detected state of the door. For example, when in the closed position, the AR system may augment a live view of a toy structure comprising the door with computer-generated images of movable objects (e.g. human- or animal like figures) that move around the environment defined by the toy structure. When the AR system detects the door to be closed, the movement of the movable objects may constrained to only a portion of the environment (or no objects may be visible at all), while the movable objects may be shown to pass through an opening covered by the door, when the door is detected to be in the open position.

Hence, when two AR markers are connected to a functional element of a toy construction model such that either one of the markers is visible depending on the state of the functional element, the state of the functional element is detectable by the AR system. As the AR marker construction elements 1111a and 1111b may be releasably connected to different functional toy construction elements, a toy construction system may comprise a first marker construction element indicative of a first state and a second marker construction element indicative of a second state, thus enabling the AR system to detect different states of different functional construction elements.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A computer-implemented method for generating an image of a toy construction model constructed from toy construction elements of a toy construction system, the toy construction elements comprising coupling means for releasably interconnecting the toy construction elements, the toy construction system comprising one or more marker construction elements comprising such coupling means and each having a visual appearance recognisable by an image processing system; the method comprising:
   capturing, by a digital camera, an image of a toy construction model constructed from the toy construction elements;
   processing, by a digital processor, the captured image to detect a position of at least one of the marker construction elements within the captured image;
   responsive to the detected position of the marker construction element, generating a computer-generated image;
   augmenting or replacing the captured image with the generated computer-generated image; and
   displaying, by a display, the generated computer-generated image or the captured image augmented with the generated computer-generated image.

2. A method according to claim 1, wherein the toy construction system comprises at least two marker construction elements, where the two marker construction elements are releasably connectable with each other via their respective coupling means, so as to form a composite marker element.

3. A method according to claim 2, further comprising detecting the composite marker element and generating the computer-generated image selectively responsive to the detection of the composite marker element.

4. A method according to claim 3, wherein each marker construction element comprises an insignia indicative of a code symbol of a code for encoding information; and wherein the method comprises determining, from the visual appearance of the composite marker element, an encoded set of code symbols, and decoding the determined set of code symbols to obtain decoded information.

5. A method according to claim 1, wherein the toy construction system comprises a gaming dice comprising a body part comprising at least six sides on which the gaming dice may sit steadily when on a plane support, and wherein at least one or more of such sides is/are provided with coupling means for mounting of one of said at least one marker construction elements.

6. A method according to claim 1, wherein the coupling means define a regular grid restricting a position and/or orientation of the toy constructing elements in a toy construction model to discrete positions and/or discrete orientations relative to said regular grid.

7. A method according to claim 6, wherein the toy construction system comprises at least two marker construction elements, and wherein the method comprises detecting respective positions and/or orientations of the two marker construction elements in a toy construction model relative to said regular grid, and generating the computer-generated image responsive to the detected respective positions and/or orientations.

8. A method according to claim 7, further comprising determining grid locations of a regular image grid from the detected locations of the marker construction elements, and generating an image feature of the computer-generated image at a location relative to the detected image grid.

9. A method according to claim 1, wherein the toy construction elements have at least one property, wherein each marker construction element of the toy construction system has a value of said property, said value being chosen from a predetermined set of discrete values of said property.

10. A method according to claim 1, wherein the marker construction element comprises an insignia and a movable element movable between a first and a second position, wherein the movable element, when positioned in the first position, causes the insignia to be visible and, when positioned in the second position, obstructs the insignia from view; and wherein the method comprises detecting at least the visibility of said insignia, and generating the computer-generated image responsive to the detected visibility of the insignia.

11. A method according to claim 1, wherein the coupling means are arranged in one or more regular planar grids defining the direction of connection; and wherein each marker construction element comprises an insignia visible, when the marker construction element is connected to at least one other toy construction element of the toy construction system, from a direction parallel to at least one of the planar grids or from a direction normal to at least one of the planar grids.

12. A method according to claim 11, wherein each of the marker construction elements has a top surface, a bottom surface, and at least one side surface; wherein said coupling means are placed on at least one of the top and the bottom surface; and wherein the marker construction element comprises at least a first surface without coupling means, where the first surface comprises said insignia.

13. A method according to claim 1, wherein the coupling means comprise one or more protrusions and one or more cavities, each cavity adapted to receive at least one of the protrusions in a frictional engagement.

14. A data processing system comprising an image capturing device, a processor, and a display, wherein the data processing system comprises a computer program configured to cause the data processing system, when executed by the data processing system, to perform the steps of the method according to claim 1.

15. A computer program product comprising program code adapted to cause, when executed by a data processing system, said data processing system to perform the steps of the method according to claim 1.

16. A computer program product according to claim 15, comprising user instructions for installing, on a data processing system comprising an image capturing device, a processor, and a display, the computer program code.

17. A method according to claim 1, further comprising displaying a composite image comprising the captured image having superimposed the generated computer-generated image.

* * * * *